United States Patent
Liu et al.

(10) Patent No.: US 10,575,268 B2
(45) Date of Patent: Feb. 25, 2020

(54) NAN SOLICITED SYNCHRONIZATION

(71) Applicant: Apple Inc., Cupertino, CA (US)

(72) Inventors: Yong Liu, Campbell, CA (US);
Christiaan A. Hartman, San Jose, CA (US); Guoqing Li, Cupertino, CA (US);
Lawrie Kurian, San Jose, CA (US);
Peter N. Heerboth, San Jose, CA (US);
Su Khiong Yong, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/969,712

(22) Filed: May 2, 2018

(65) Prior Publication Data
US 2018/0332547 A1  Nov. 15, 2018

Related U.S. Application Data

(60) Provisional application No. 62/506,092, filed on May 15, 2017.

(51) Int. Cl.
| | |
|---|---|
| *H04W 56/00* | (2009.01) |
| *H04L 29/08* | (2006.01) |
| *H04W 8/00* | (2009.01) |
| *H04W 68/00* | (2009.01) |
| *H04W 84/12* | (2009.01) |

(52) U.S. Cl.
CPC ......... *H04W 56/001* (2013.01); *H04L 67/104* (2013.01); *H04W 8/005* (2013.01); *H04W 68/00* (2013.01); *H04W 84/12* (2013.01)

(58) Field of Classification Search
CPC ... H04W 56/001; H04W 8/005; H04W 68/00; H04W 84/12; H04L 67/16; H04L 67/104; H04L 67/1059
See application file for complete search history.

(56) References Cited

U.S. PATENT DOCUMENTS

| | | | |
|---|---|---|---|
| 9,439,147 B2 | 9/2016 | Huang et al. | |
| 9,723,581 B2 | 8/2017 | Patil et al. | |
| 9,843,995 B2 | 12/2017 | Abraham et al. | |
| 9,872,227 B2 | 1/2018 | Shukla et al. | |
| 9,883,472 B1* | 1/2018 | Tamhane | H04W 56/001 |
| 10,098,081 B2* | 10/2018 | Kim | H04W 8/005 |
| 2014/0153550 A1* | 6/2014 | Qi | H04W 56/001 |
| | | | 370/336 |
| 2015/0006633 A1 | 1/2015 | Vandwalle et al. | |
| 2015/0016359 A1* | 1/2015 | Wang | H04W 74/04 |
| | | | 370/329 |
| 2015/0163828 A1 | 6/2015 | Vandwalle et al. | |
| 2015/0341811 A1* | 11/2015 | Deshpande | H04W 24/08 |
| | | | 370/252 |
| 2016/0249200 A1 | 8/2016 | Liu et al. | |
| 2016/0270137 A1 | 9/2016 | Yong et al. | |
| 2016/0277914 A1* | 9/2016 | Kim | H04W 8/005 |

(Continued)

*Primary Examiner* — Habte Mered
(74) *Attorney, Agent, or Firm* — Kowert Hood Munyon Rankin and Goetzel PC; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to a mechanism for a device to request synchronization assistance from one or more neighboring peer devices.

20 Claims, 9 Drawing Sheets

(56) References Cited

U.S. PATENT DOCUMENTS

| | | |
|---|---|---|
| 2016/0278112 A1 | 9/2016 | Liu et al. |
| 2016/0309315 A1 | 10/2016 | Shmukler et al. |
| 2016/0309472 A1 | 10/2016 | Yong et al. |
| 2016/0309493 A1 | 10/2016 | Shmukler et al. |
| 2016/0353233 A1 | 12/2016 | Yong et al. |
| 2017/0013572 A1 | 1/2017 | Jayaraman et al. |
| 2017/0026901 A1* | 1/2017 | Patil ................... H04W 48/16 |
| 2017/0055305 A1 | 2/2017 | Kurian et al. |
| 2017/0086157 A1* | 3/2017 | Abraham ............ H04W 56/004 |
| 2017/0127344 A1 | 5/2017 | Liu et al. |
| 2017/0127369 A1 | 5/2017 | Liu et al. |
| 2017/0127464 A1 | 5/2017 | Liu et al. |
| 2017/0150296 A1* | 5/2017 | Jung .................. H04L 12/1886 |
| 2017/0201866 A1 | 7/2017 | Liu et al. |
| 2017/0339733 A1 | 11/2017 | Kurian et al. |
| 2017/0347255 A1 | 11/2017 | Liu et al. |
| 2018/0103362 A1* | 4/2018 | Segev .................. H04W 8/005 |
| 2018/0139600 A1* | 5/2018 | Kim ..................... H04W 8/005 |
| 2018/0206283 A1* | 7/2018 | Fujimori ................ H04W 4/08 |
| 2019/0098690 A1* | 3/2019 | Kim ....................... H04W 4/70 |
| 2019/0124611 A1* | 4/2019 | Pang .................... H04W 56/00 |

\* cited by examiner

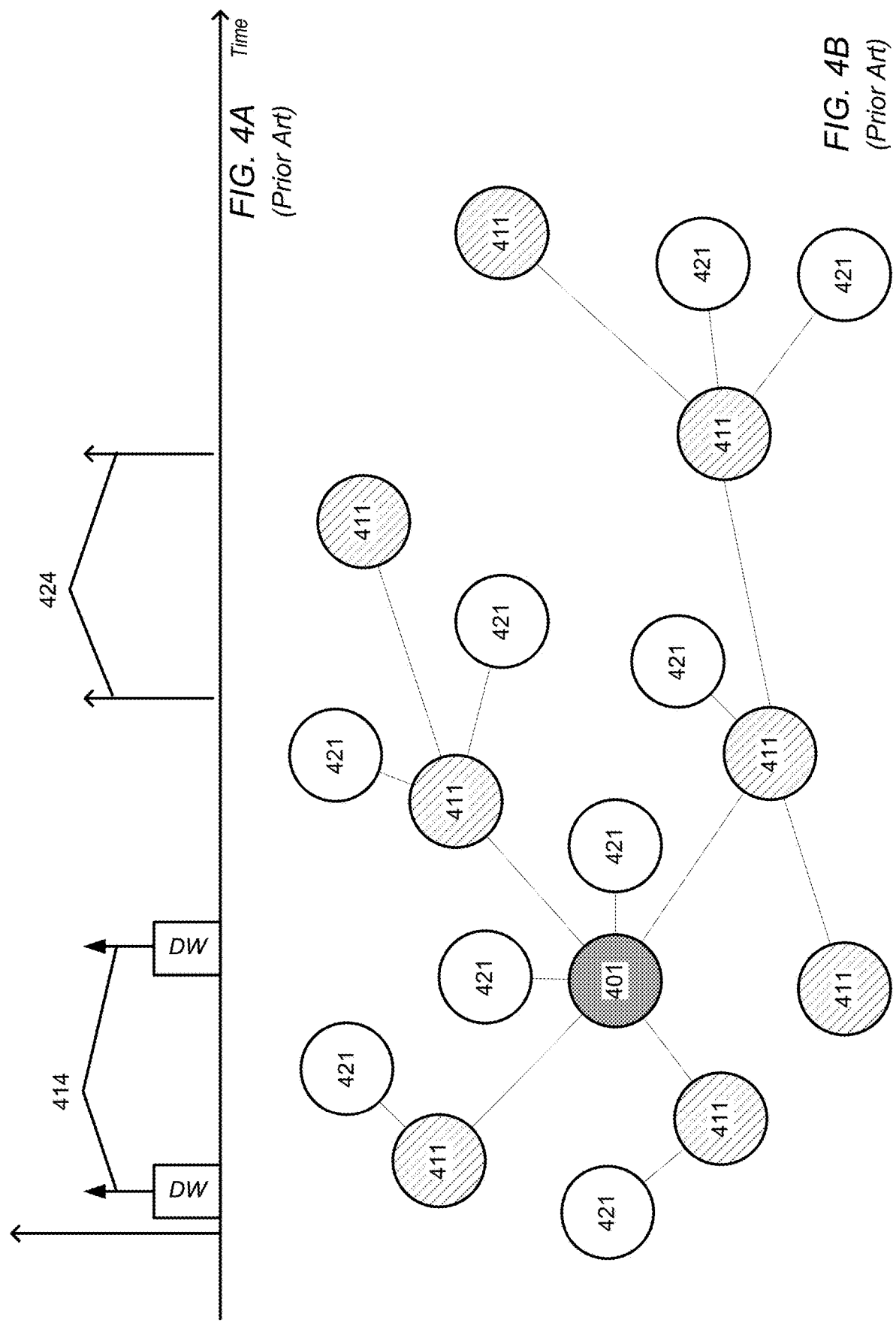

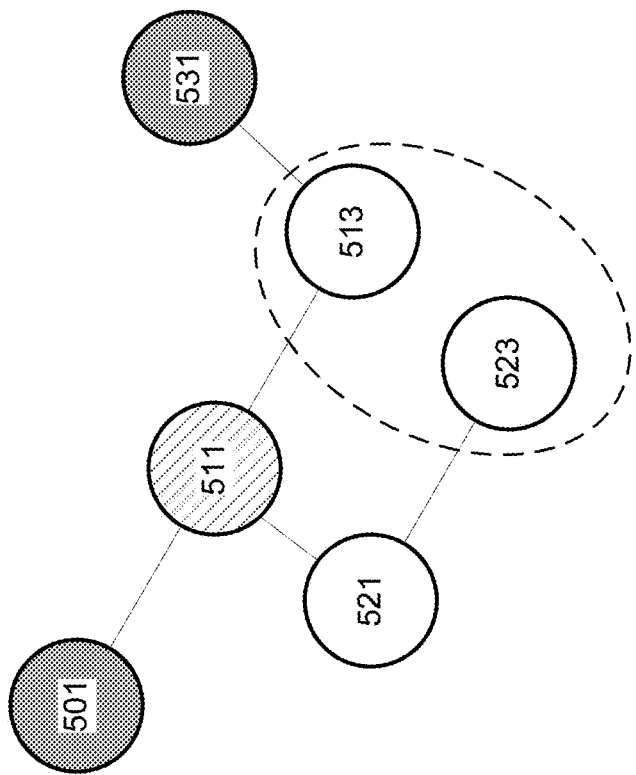
FIG. 5B *(Prior Art)*
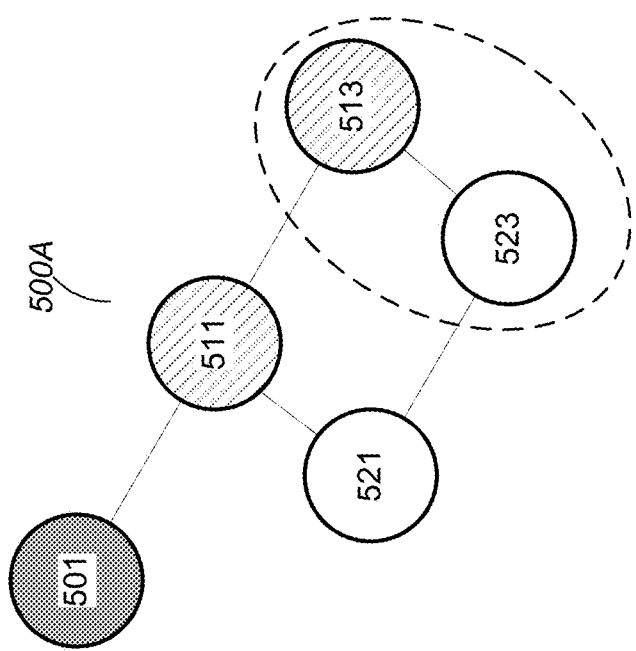
FIG. 5A *(Prior Art)*

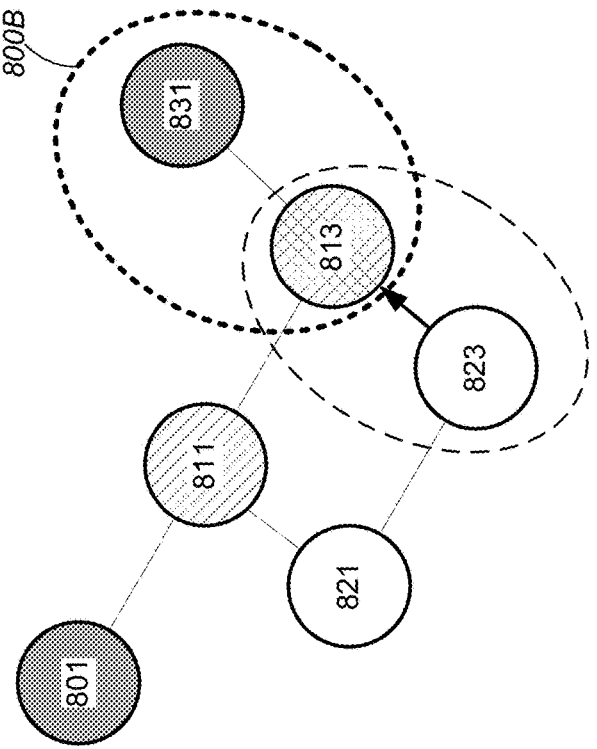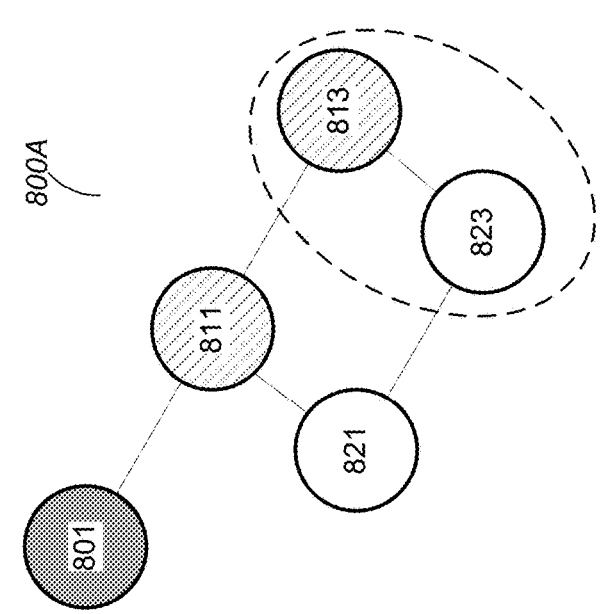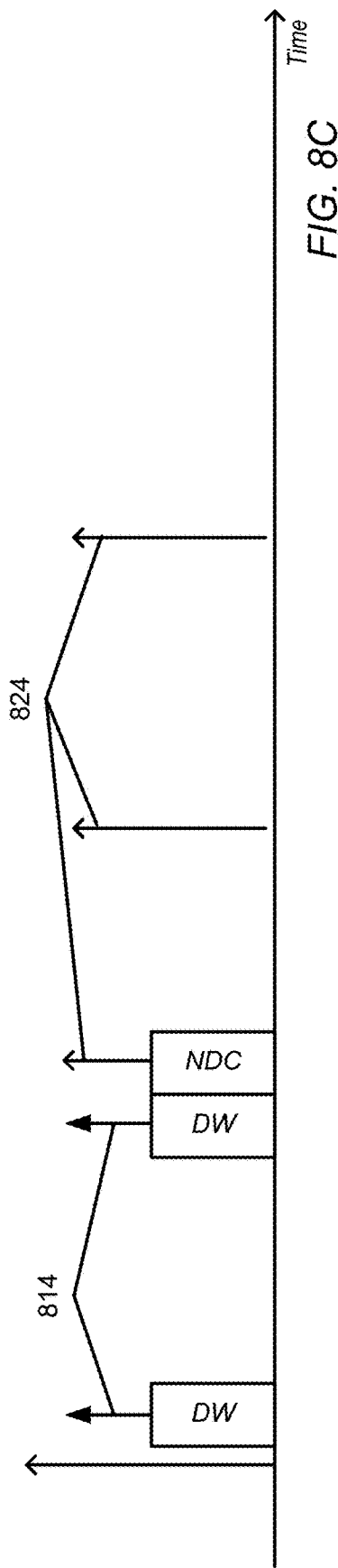
FIG. 8A
FIG. 8B
FIG. 8C

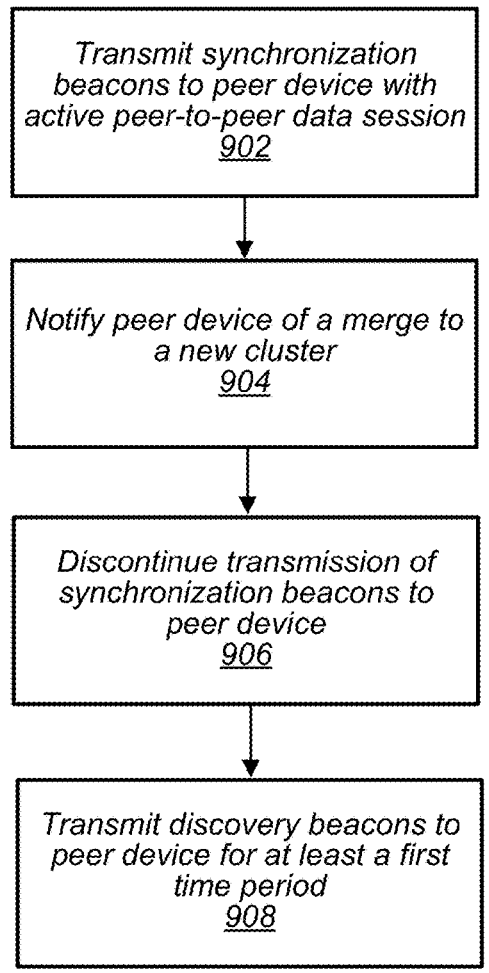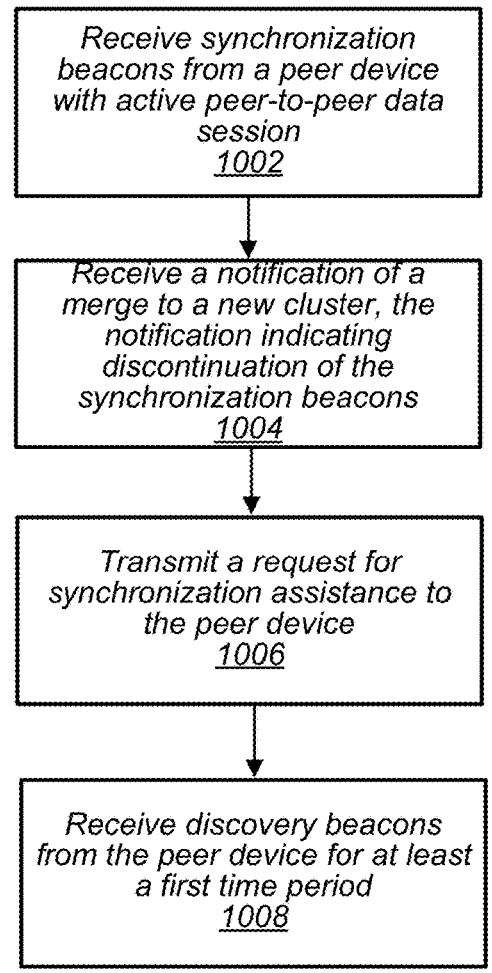
FIG. 9
FIG. 10

NAN SOLICITED SYNCHRONIZATION

PRIORITY DATA

This application claims benefit of priority to U.S. Provisional Application Ser. No. 62/506,092, titled "NAN Solicited Synchronization", filed May 15, 2017, by Yong Liu, Christiaan A. Hartman, Guoqing Li, Lawrie Kurian, Peter N. Heerboth, and Su Khiong Yong, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to solicit synchronization beacons. For example, in some embodiments, a wireless station may request a peer wireless station provide synchronization beacons such that the wireless station may continue to synchronize with the peer wireless station.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to transmit a pause indication to neighboring peer wireless stations.

In some embodiments, the communications may be performed via a peer-to-peer wireless communications protocol such as Neighbor Awareness Networking (NAN). Thus, embodiments of the disclosure also relate to a NAN device transmitting a pause indication to neighboring peer wireless stations.

In some embodiments, a wireless station may be configured to transmit, while operating in a first state, synchronization beacons to a peer wireless station within one or more discovery windows. The peer wireless station and the wireless station may have an active peer-to-peer data session and may be associated with a first cluster of devices. The wireless station may be configured to notify the peer wireless station of a merge to a second cluster of devices and transition to a second state where transmissions of synchronization beacons to the peer wireless station are discontinued. In addition, the wireless station may be configured to transmit, while operating in the second state and for at least a first time period, discovery beacons to the peer wireless station in one or more data cluster management windows.

In some embodiments, a wireless station may be configured to receive synchronization beacons from a peer wireless station within one or more discovery windows. The peer wireless station may be operating in a first state. In addition, the peer wireless station and the wireless station may have an active peer-to-peer data session and may be associated with a first cluster of devices. The wireless station may be configured to receive a notification from the peer wireless station of a merge to a second cluster of devices. The peer wireless station may be configured to transition from the first state to a second state in response to the merge. In addition, in response to the transition to the second state, the peer wireless station may be configured to discontinue transmissions of synchronization beacons. The wireless station may be configured to transmit a request for synchronization assistance to the peer wireless station and receive, in response to the request, discovery beacons from the peer wireless station in one or more data cluster management windows.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 4A-B illustrate an example of transmission of beacons for a synchronization tree.

FIGS. 5A-B illustrate an example of a device changing synchronization from a first anchor master to a second anchor master.

FIGS. 8A-C illustrate an example of a device requesting transmission of beacons after a peer device switches to a new anchor master, according to some embodiments.

FIGS. 9-10 illustrate block diagrams of examples of methods for peer wireless stations to solicit synchronization beacons, according to some embodiments.

Figure 1:
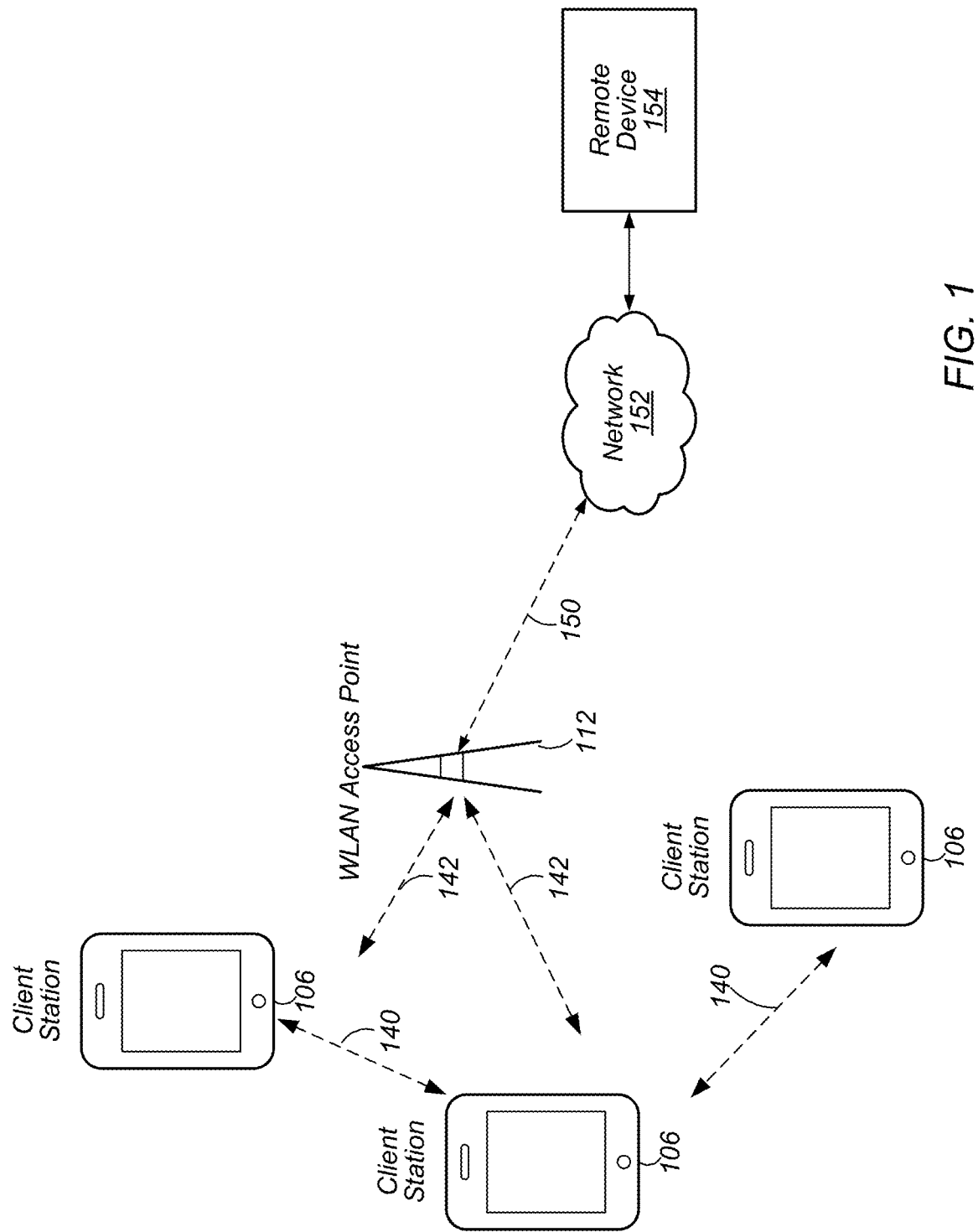
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices)

which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to transmit, while operating in a first state, synchronization beacons to a peer wireless device within one or more discovery windows. The peer wireless device and the wireless device 106 may have an active peer-to-peer data session and may be associated with a first cluster of devices. The wireless device 106 may be configured to notify the peer wireless device of a merge to a second cluster of devices and transition to a second state where transmissions of synchronization beacons to the peer wireless device are discontinued. In addition, the wireless device 106 may be configured to transmit, while operating in the second state and for at least a first time period, discovery beacons to the peer wireless device in one or more data cluster management windows.

In some embodiments, as further described below, a wireless device 106 may be configured to perform methods to receive synchronization beacons from a peer wireless device within one or more discovery windows. The peer wireless device may be operating in a first state. In addition, the peer wireless device and the wireless device 106 may have an active peer-to-peer data session and may be associated with a first cluster of devices. The wireless device 106 may be configured to receive a notification from the peer wireless device of a merge to a second cluster of devices. The peer wireless device may be configured to transition from the first state to a second state in response to the merge. In addition, in response to the transition to the second state, the peer wireless device may be configured to discontinue transmissions of synchronization beacons. The wireless device 106 may be configured to transmit a request for synchronization assistance to the peer wireless device and receive, in response to the request, discovery beacons from the peer wireless device in one or more data cluster management windows.

Figure 2:
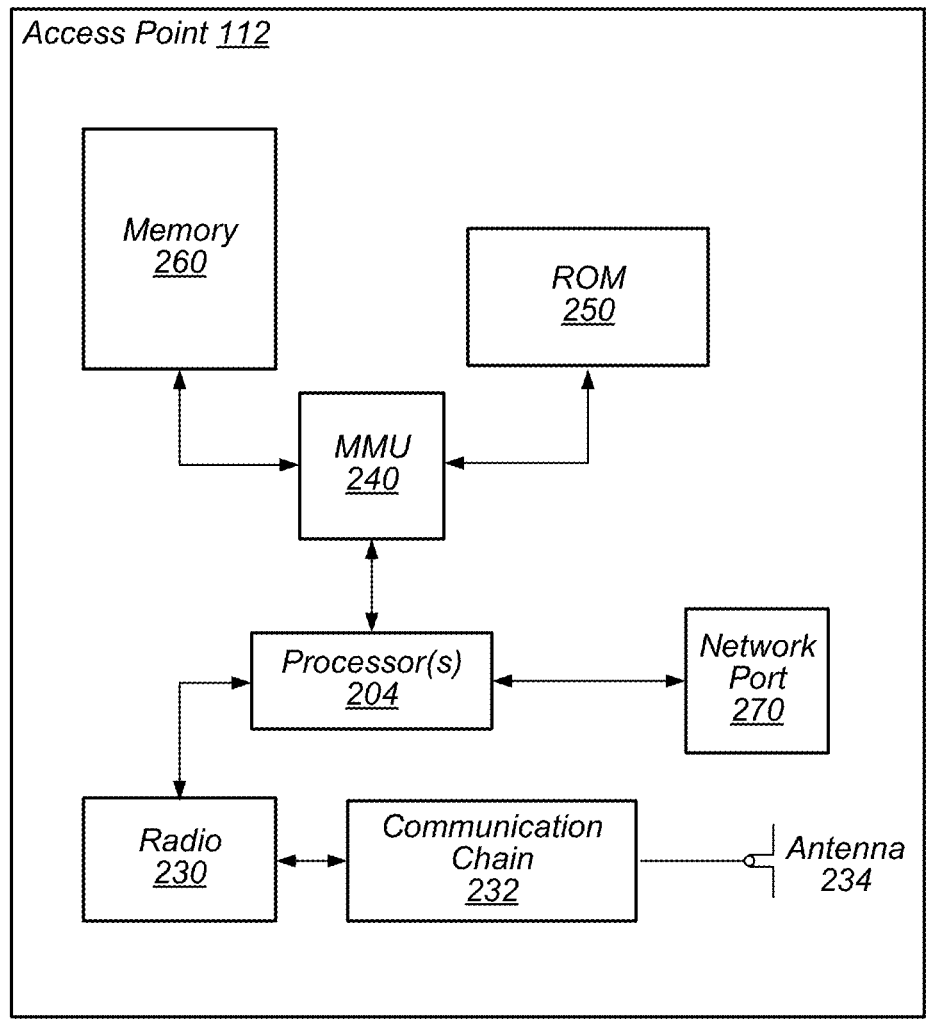
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to transmit, while operating in a first state, synchronization beacons to a peer wireless device within one or more discovery windows. The peer wireless device and the AP 112 may have an active peer-to-peer data session and may be associated with a first cluster of devices. The AP 112 may be configured to notify the peer wireless device of a merge to a second cluster of devices and transition to a second state where transmissions of synchronization beacons to the peer wireless device are discontinued. In addition, the AP 112 may be configured to transmit, while operating in the second state and for at least a first time period, discovery beacons to the peer wireless device in one or more data cluster management windows.

In some embodiments, as further described below, an AP 112 may be configured to perform methods to receive synchronization beacons from a peer wireless device within one or more discovery windows. The peer wireless device may be operating in a first state. In addition, the peer wireless device and the AP 112 may have an active peer-to-peer data session and may be associated with a first cluster of devices. The AP 112 may be configured to receive a notification from the peer wireless device of a merge to a second cluster of devices. The peer wireless device may be configured to transition from the first state to a second state in response to the merge. In addition, in response to the transition to the second state, the peer wireless device may be configured to discontinue transmissions of synchronization beacons. The AP 112 may be configured to transmit a request for synchronization assistance to the peer wireless device and receive, in response to the request, discovery beacons from the peer wireless device in one or more data cluster management windows.

Figure 3:
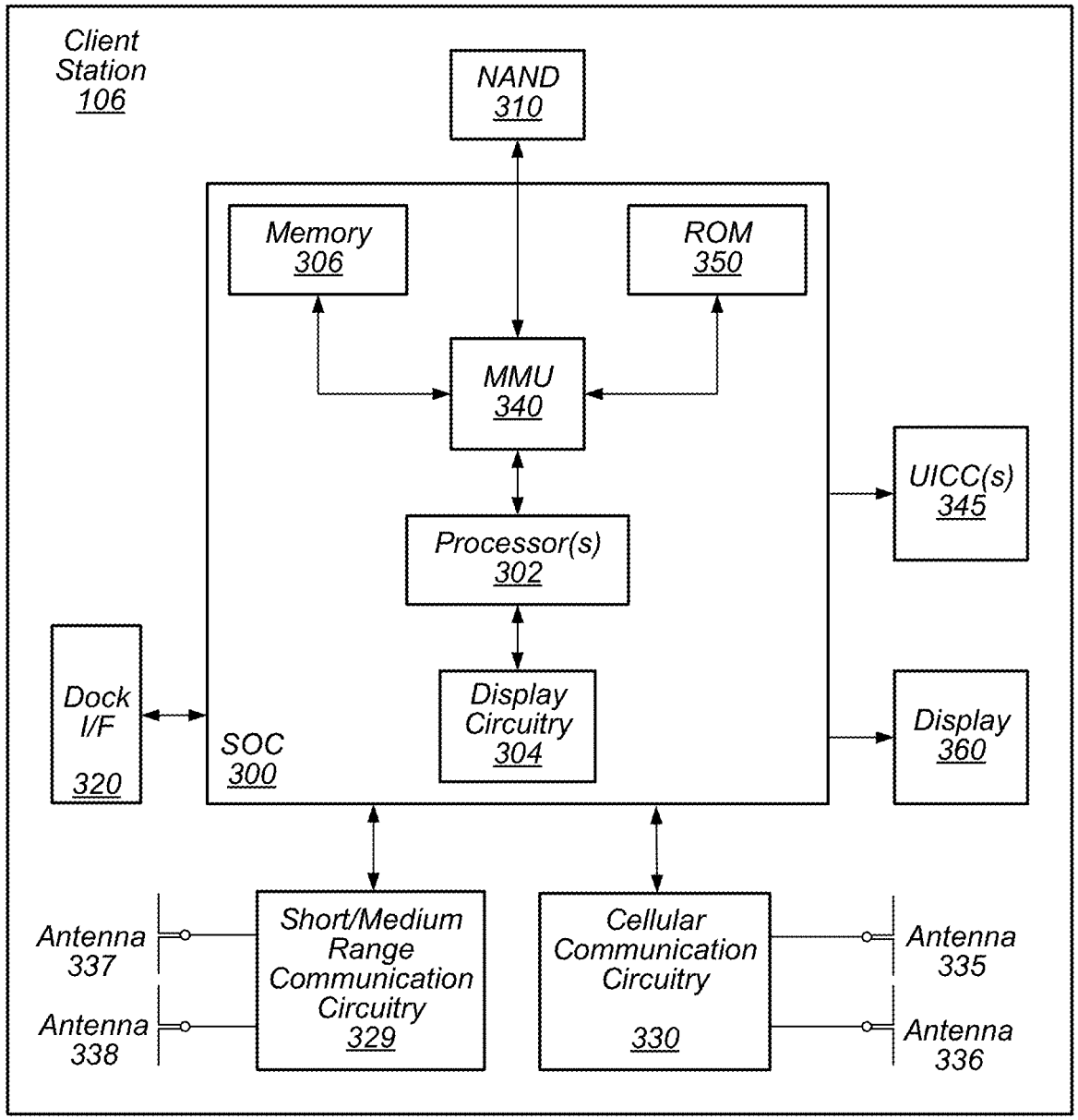
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1.

Further, in some embodiments, as further described below, client station 106 may be configured to perform methods to transmit, while operating in a first state, synchronization beacons to a peer client station within one or more discovery windows. The peer client station and the client station 106 may have an active peer-to-peer data session and may be associated with a first cluster of devices. The client station 106 may be configured to notify the peer client station of a merge to a second cluster of devices and transition to a second state where transmissions of synchronization beacons to the peer client station are discontinued. In addition, the client station 106 may be configured to transmit, while operating in the second state and for at least a first time period, discovery beacons to the peer client station in one or more data cluster management windows.

In some embodiments, as further described below, a client station 106 may be configured to perform methods to receive synchronization beacons from a peer client station within one or more discovery windows. The peer client station may be operating in a first state. In addition, the peer client station and the client station 106 may have an active peer-to-peer data session and may be associated with a first cluster of devices. The client station 106 may be configured to receive a notification from the peer client station of a merge to a second cluster of devices. The peer client station may be configured to transition from the first state to a second state in response to the merge. In addition, in response to the transition to the second state, the peer client station may be configured to discontinue transmissions of synchronization beacons. The client station 106 may be configured to transmit a request for synchronization assistance to the peer client station and receive, in response to the request, discovery beacons from the peer client station in one or more data cluster management windows.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information (e.g., per NAN 2.0). The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods (and/or mechanisms) for a wireless station (including, but not limited to, a NAN device) to maintain synchronization to a neighboring wireless station via solicitation of synchronization beacons from the neighboring wireless station.

Solicited Synchronization

In some implementations, peer wireless stations may transmit (or broadcast) synchronization and/or discovery beacons periodically on a social channel. The social channel may, for example, be a channel specified for transmission and/or reception of synchronization and/or discovery beacons within a peer-to-peer protocol. In addition, in some implementations, the social channel may, for example, be a channel that peer wireless stations may periodically tune to for reception and/or transmission (broadcast) of synchronization and/or discovery beacons, among other processes, e.g., such as service negotiation and cluster management. For example, as illustrated by FIG. 4A, synchronization (414) and/or discovery beacons (424) may carry (or include) information that may be used to elect an anchor (or timing) master. The anchor (or timing) master may be, for example, a wireless station to which other wireless stations may synchronize. The synchronization may occur either via reception of a beacon from the anchor (or timing) master or reception of a beacon that carries or includes information to allow for synchronization to the anchor master. In addition, synchronization and/or discovery beacons may carry (or include) information that may be used to form a synchronization tree (or cluster), e.g., as illustrated by FIG. 4B. As illustrated by FIG. 4A, a communication schedule may include multiple discovery windows in which discover beacons 414 may be transmitted. In addition, as shown, synchronization beacons 424 may be transmitted outside of the discovery windows.

In some implementations, a wireless station with a highest rank (e.g., device 401) as compared to neighboring wireless stations may be elected as the anchor master (or timing master), e.g., the clock source. The rank may be based, at least in part, on a number of current peer-to-peer connections (data sessions such as a NAN datapath or NAN data link) of a wireless station, requirements of current peer-to-peer connections, such as quality of service, and/or scheduling limitations. In other words, a wireless station with a most restrictive communication schedule may be elected anchor master. Note that communication schedules may become more restrictive as a number of peer-to-peer connections are increased and/or as quality of service requirements increase. Once elected, the anchor master may provide timing synchronization for wireless stations within the synchronization tree (or cluster) via direct broadcast (and reception) of beacons from the anchor master and/or via forwarding of synchronization information on behalf of the anchor master to wireless stations not within range to receive beacons from the anchor master. Note that synchronization and/or discovery beacons may also be used for service discovery.

For example, as illustrated by FIG. 4B, once an anchor master (device 401) has been determined for a NAN cluster, remaining devices in the NAN cluster may assume roles of non-master non-sync (e.g., as denoted by devices 421 in the device tree of FIG. 4B) or sync master (e.g., as denoted by devices 411 in the device tree of FIG. 4B). A device in a NAN cluster may become a non-master non-sync (NMNS) device (e.g., a tree leaf), if the device detects one or more sync master devices in close proximity to the device. Note that sync master devices typically have higher ranks and/or smaller hop counts to the anchor master. In addition, sync master devices may transmit NAN beacons (e.g., discovery and/or synchronization beacons) to maintain synchronization with NMNS devices. NMNS devices may not transmit NAN beacons. For example, in some implementations, NMNS devices may not transmit NAN beacons in order to save power. As another example, NMNS devices may not transmit NAN beacons in order to reduce medium congestion (e.g., "beacon pollution") on NAN social channels.

However, in some implementations and/or scenarios, a device that is a master sync device may transition to a NMNS device. In such instances, the device may discontinue transmission of NAN beacons and other NMNS devices relying on the device for timing information (e.g., synchronization beacons) may lose synchronization to the device (e.g., due to not receiving NAN beacons from the device). Thus, the other NMNS devices' clocks may drift from the device's clock (as well as the anchor master's clock), and synchronization may be lost.

For example, as illustrated by FIGS. 5A-B, device 513 and device 523 are initially synchronized in a NAN cluster 500A with device 501 as anchor master. As shown, device 513 may be device 523's sync master and device 511 may be device 521's sync master. Thus, devices 521 and 523 may be NMNS devices. In addition, device 513 and device 523 may have established a datapath for service. Further, as illustrated by FIG. 5B, device 513 may discover a new NAN cluster with device 531 as anchor master. Device 531 may have a higher master rank than device 501, thus the cluster anchored by device 531 may have a higher cluster grade than NAN cluster 500A. Thus, device 513 may determine to merge to the cluster anchored by device 531 and may inform device 523 to also merge to maintain the datapath. However, since device 513 is in close proximity to device 531, device 513 may transition to a NMNS role and discontinue transmissions of NAN beacons. Thus, without receipt of the NAN beacons from device 513, device 523 may lose synchronization to device 513 and device 523's clock may drift away from device 513's clock and the datapath may be lost.

Figure 6B:
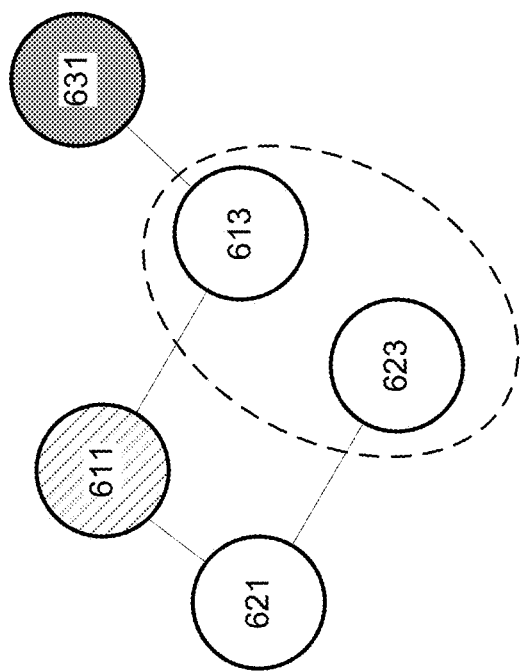
FIGS. 6A-B illustrate another example of a device changing synchronization from a first anchor master to a second anchor master, according to some embodiments.
Figure 6A:
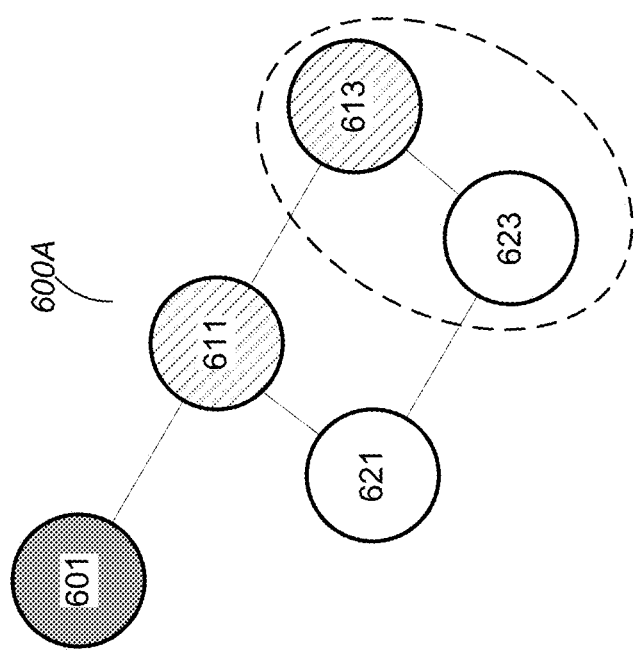

As another example, as illustrated by FIGS. 6A-B, device 613 and device 623 are initially synchronized in a NAN cluster 600A (anchor master device 601). As shown, device 613 may be device 623's sync master and device 611 may be device 621's synch master. Thus, devices 621 and 623 may be NMNS devices. In addition, device 613 and device 623 may have established a datapath for service. Further, as illustrated by FIG. 6B, device 601 may leave NAN cluster 600A and a new anchor master (e.g., device 631) may be elected anchor master (e.g., based on master rank). However, since device 613 is in close proximity to device 631, device 613 may transition to a NMNS role and discontinue transmissions of NAN beacons. Thus, without receipt of the NAN beacons from device 613, device 623 may lose synchronization to device 613 and device 623's clock may drift away from device 613's clock and the datapath may be lost.

In some embodiments, a wireless station (e.g., such as wireless station 106 described above) with active peer-to-peer communication sessions with neighboring wireless stations (e.g., at least one active datapath) may continue to transmit discovery and/or synchronization beacons for a first time period (e.g., a transition period) when the wireless station changes roles from a synchronization device to a non-synchronization device (e.g., in terms of NAN 2.0, a sync master device to a non-master non-sync device). In some embodiments, the wireless station may discontinue transmission of discovery and/or synchronization beacons if the wireless station does not receive a request from at least one neighboring wireless station for synchronization assistance during the first time period.

Figure 7B:
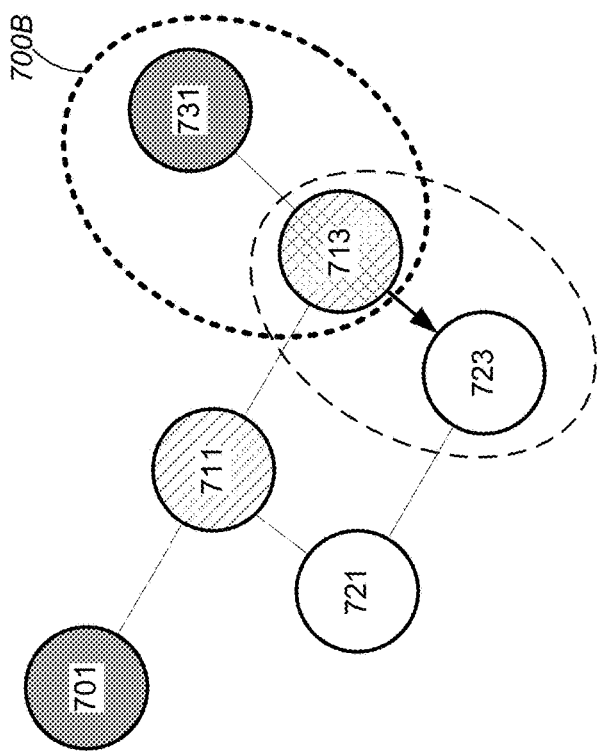
FIGS. 7A-C illustrate an example of a device continuing to transmit beacons after switching to a new anchor master, according to some embodiments.
Figure 7A:
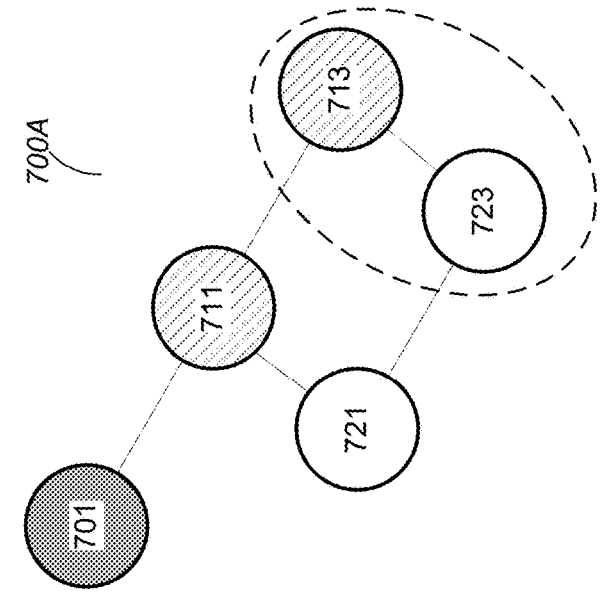
Figure 7C:
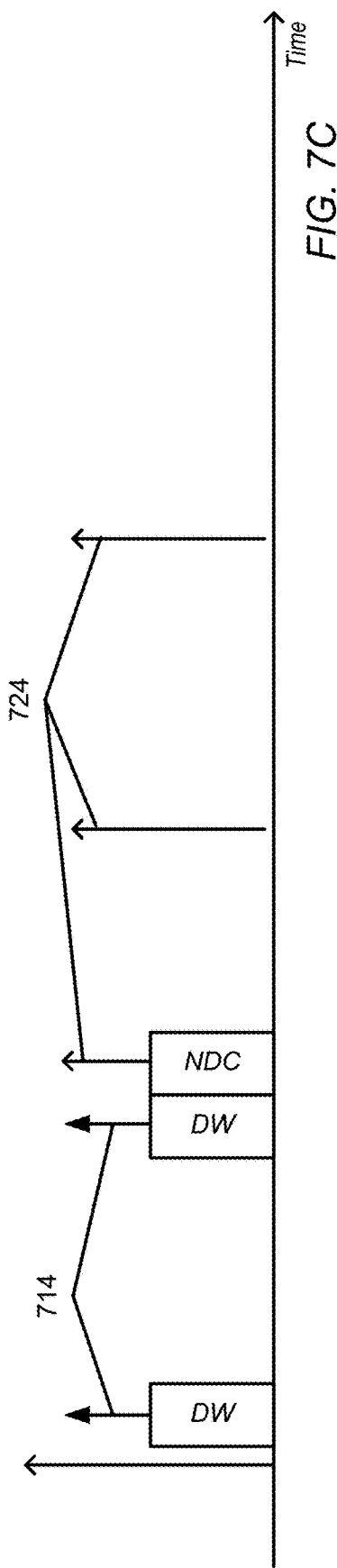

For example, as illustrated by FIGS. 7A-C, when a wireless station, e.g., such as device 713, with active NAN operations merges from NAN cluster 700A (with master device 701 and device 711 and 721) to NAN cluster 700B (with master device 731) and transitions from a master sync role (e.g., as illustrated in FIG. 7A) to a non-master non-sync (NMNS) role (e.g., as illustrated in FIG. 7B), the wireless station (device 713) may continue to transmit discovery and/or synchronization beacons (e.g., beacons 714 and/or 724 as illustrated in FIG. 7C) for a transition period (e.g., 4, 8, 12, 16, 20, 24, 28, or 32 discovery window intervals, among other time periods). Such transmissions may allow active peers (e.g., neighboring wireless stations with active datapaths with device 713) to maintain synchronization during the cluster transition. In other words, device 713 may transition from a master sync role to a NMNS role as during a cluster transition in order to maintain synchronization with device 723.

In some embodiments, device 713 may transmit the discovery and/or synchronization beacons during the transition period in NAN data cluster (NDC) windows (e.g., common time windows established with active peers for NAN operation management purposes). In some embodiments, device 713 may conduct random backoff before transmitting the discovery and/or synchronization beacons within the NAN data cluster window. In some embodiments, device 713 may suppress beacon transmissions in the NDC window if device 713 receives discovery beacons from neighboring wireless stations.

In some embodiments, device 713 may discontinue transmission of beacons if device 713 does not receive a request from at least one neighboring wireless station (e.g., such as device 723) for synchronization assistant during the transition period. For example, in some embodiments, a wireless station (e.g., such as wireless station 106 and/or device 723) with active peer-to-peer communication sessions with a neighboring wireless station (e.g., an active datapath with a device such as device 713) may require synchronization assistance (e.g., if the wireless station relied upon the neighboring wireless station for synchronization and the neighboring wireless station discontinued transmissions of beacons) and may request the neighboring wireless station (e.g., device 713) to transmit and/or continue to transmit discovery and/or synchronization beacons (e.g., beacons 714 and/or 724) within scheduled communication windows (e.g., NAN data cluster windows). In some embodiments, the wireless station may determine that synchronization assistance is required based (at least in part) on not receiving new (or fresh) synchronization beacons (e.g., with an anchor master's updated timestamp) within discovery windows and/or needing to maintain operations with one or more active peers within a cluster of devices.

As a further example, as illustrated by FIGS. 8A-C, when a wireless station, e.g., such as device 823, with active NAN operations with a neighboring wireless station, e.g., such as device 813, determines that it requires synchronization assistance, e.g., because device 813 has merged (or is merging) from NAN cluster 800A (which may include anchor master 801 and devices 811 and 821) to NAN cluster 800B (which may include anchor master 831) and transitions from a master sync role to a non-master non-sync (NMNS) role, the wireless station (device 823) may request that device 813 transmit and/or continue to transmit discovery and/or synchronization beacons (e.g., beacons 814 and/or 824) within scheduled communication windows (e.g., NAN data cluster (NDC) windows). In some embodiments, device 823 may determine that synchronization assistance is required based (at least in part) on not receiving new (or fresh) synchronization beacons (e.g., with an anchor master's updated timestamp) within discovery windows and/or needing to maintain operations with one or more active peers within a cluster of devices.

In some embodiments, to request synchronization assistance, a wireless station such as wireless station 106 (and/or devices 723 and 823), may transmit a broadcast or unicast message requesting synchronization assistance. In some embodiments, the wireless station may transmit a broadcast message within NAN data cluster windows to request synchronization assistance. In some embodiments, the broadcast message may be a beacon frame and/or a schedule update notification frame. In some embodiments, the frame (or message) may include a synchronization assistance flag. For example, the synchronization assistance flag may be included in a NAN data cluster attribute carried by the beacon or schedule update notification frame. In some embodiments, the wireless station may transmit (or re-transmit the message to refresh the request for synchronization assistance).

Note that in some embodiments, when a peer device in a NMNS state (or role) receives a message requesting synchronization assistance, the peer device may provide synchronization assistance via transmission of discovery and/or synchronization beacons within NAN data cluster windows (e.g., as described above in reference to FIGS. 7A-C and 8A-C). In some embodiments, the peer device may terminate the synchronization assistance after a certain period and/or when the peer device tears down (discontinues) a NAN device link or datapath with the requesting device.

In some embodiments, the wireless station may transmit a unicast message to a peer device to request synchronization assistance. For example, the unicast message may be a schedule update notification message and/or a schedule request message (e.g., used for NAN data link schedule update). In some embodiments, the unicast message may include a synchronization assistance flag. Note that, according to some embodiments, if schedule request message is used, the peer device may send back a schedule response message to accept and/or reject the request for synchronization assistance. In some embodiments, if the peer device accepts the request for synchronization assistance, the peer device may provide synchronization by transmitting discovery and/or synchronization beacons within NAN data cluster windows until the datapath or NAN data link between is terminated.

In some embodiments, when a wireless station, such as wireless station 106, requesting synchronization assistance receives discovery and/or synchronization beacons within NAN data cluster windows, the wireless station may use the discovery and/or synchronization beacons to synchronize its clock, determine its hop count, and/or and refresh its record of the anchor master's timestamp. Note that as long as the wireless station can obtain the anchor master's updated timestamp from the discovery and/or synchronization beacons, the wireless station may not expire the anchor master record and may serve as a master device to aid propagation of cluster synchronization information to its neighboring peer devices.

In some embodiments, a wireless station, such as wireless station 106, may determine that synchronization assistance is no longer necessary when the wireless station receives new (e.g., fresh or updated) synchronization beacons within discovery windows. In other words, if wireless station may use receipt of synchronization beacons within discovery windows as an indication that a new master sync device is within range and may be used for synchronization to the anchor master. Thus, in some embodiments, the wireless station may transmit a schedule update notification message to a peer that is providing synchronization assistance. In some embodiments, the message may include a synchronization assistance cancellation flag. In such embodiments, when the peer device in NMNS state receives such a cancellation notification, the peer device may discontinue transmission of discovery and/or synchronization beacons in NAN data cluster windows.

FIG. 9 illustrates a block diagram of an example of a method for peer wireless stations to solicit synchronization beacons, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a wireless device (e.g., client station 106) may transmit synchronization beacons to a peer device (and/or peer devices) with an active peer-to-peer data session. For example, the wireless station may transmit, while operating in a first state, synchronization beacons to the peer device within one or more discovery windows. The first state may be associated with a sync master state of operation, in some embodiments. In some embodiments, the peer-to-peer data session may be a NAN datapath and/or a NAN data link. In some embodiments, the wireless device and the peer device may be associated with a cluster of devices (e.g., a first cluster of devices such as a NAN cluster and/or a NAN data cluster).

At 904, the wireless device may notify the peer device of a merge (e.g., switch) to a new cluster of devices (e.g., a second cluster of devices). For example, the wireless device may determine to switch to (e.g., begin synchronizing with) the new cluster of devices and notify the peer device of the switch. In some embodiments, the merge (or switch) may be based, at least in part, on the new cluster of devices advertising (or having) a higher master rank value than a master rank value of the cluster of devices the wireless device is associated with.

At 906, the wireless device may discontinue transmission of the synchronization beacons to the peer device. For example, the wireless device may transition to a second state in which transmissions of synchronization beacons to the peer device may be discontinued. In some embodiments, the second state may be associated with a non-master non-sync (NMNS) state of operation.

At 908, the wireless device may transmit discovery beacons to the peer device for at least a first time period. For example, while operating in the second state, the wireless device may transmit discovery beacons to the peer device in one or more data cluster management windows for at least a first time period. In some embodiments, the wireless device may continue, in response to receiving a request for synchronization assistance from the peer device, transmission of discovery beacons after the first time period. In some embodiments, the request for synchronization assistance may be received during a data cluster management window. In some embodiments, the request for synchronization may be received via a broadcast message and/or a unicast message. In some embodiments, the broadcast message may be a beacon frame and/or a schedule update notification frame. In some embodiments, the unicast message may include a schedule update message notification and/or a schedule request message. In some embodiments, a synchronization assistance flag may indicate the request for synchronization assistance. In some embodiments, the synchronization flag may be included in the broadcast message and/or the unicast message.

Further, in some embodiments, the wireless device may discontinue transmission of discovery beacons after the first time period if a request for synchronization assistance is not received during prior to the end of the first time period. In other words, in response to not receiving a request for synchronization assistance from the peer device, the wireless device may discontinue transmission of discovery beacons after the first time period. In some embodiments, the wireless device may discontinue transmission of discovery beacons in data cluster management windows if the peer-to-peer data session is terminated. In other words, in response to termination of the peer-to-peer data session, the wireless device may discontinue transmission of discovery beacons in data cluster management windows.

In some embodiments the first time period may be a transition period. For example, in some embodiments, the transition period may include a specified number of discovery window intervals, e.g., such as 4, 8, 12, 16, 20, 24, 28, and/or 32 discovery window intervals, among other time periods. In some embodiments, the transition period may be based, at least in part, on a duration of a cluster transition, e.g., a time period associated with transition from synchronizing with a first cluster to synchronizing with a second cluster.

FIG. 10 illustrates a block diagram of another example of a method for peer wireless stations to solicit synchronization beacons, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a wireless device (e.g., client station 106) may receive synchronization beacons from a peer device with an active peer-to-peer data session with the wireless device. In some embodiments, the synchronization beacons may be received in discovery windows. In some embodiments, the peer device may be operating in a first state. The first state may be associated with a sync master state of operation, in some embodiments. In some embodiments, the peer-to-peer data session may be a NAN datapath and/or a NAN data link. In some embodiments, the wireless device and the peer device may be associated with a cluster of devices (e.g., a first cluster of devices such as a NAN cluster and/or a NAN data cluster).

At 1004, the wireless device may receive a notification of a merge (or switch) to a new cluster from the peer device. The notification may indicate discontinuation of the synchronization beacons. For example, the peer device may transition to a second state in which transmissions of synchronization beacons to the wireless device may be discontinued. In some embodiments, the second state may be associated with a non-master non-sync (NMNS) state of operation.

At 1006, the wireless device may transmit a request for synchronization assistance to the peer device. In some embodiments, the request for synchronization assistance may be received during a data cluster management window. In some embodiments, the request for synchronization may be transmitted via a broadcast message and/or a unicast message. In some embodiments, the broadcast message may be a beacon frame and/or a schedule update notification frame. In some embodiments, the unicast message may include a schedule update message notification and/or a schedule request message. In some embodiments, a synchronization assistance flag may indicate the request for synchronization assistance. In some embodiments, the synchronization flag may be included in the broadcast message and/or the unicast message.

At 1008, the wireless device may receive discovery beacons from the peer device for at least a first time period, e.g., responsive to the request for synchronization assistance. In some embodiments the first time period may be a transition period. For example, in some embodiments, the transition period may include a specified number of discovery window intervals, e.g., such as 4, 8, 12, 16, 20, 24, 28, and/or 32 discovery window intervals, among other time periods. In some embodiments, the transition period may be based, at least in part, on a duration of a cluster transition, e.g., a time period associated with transition from synchronizing with a first cluster to synchronizing with a second cluster. In some embodiments, in response to receiving a synchronization beacon in a discovery window, the wireless device may transmit a request to cancel synchronization assistance to the peer device. In some embodiments, the request to cancel synchronization assistance may be included in a schedule update notification message. In some embodiments, the request to cancel synchronization assistance may include a synchronization assistance cancellation flag indicating the request to cancel.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform short range communications via a Wi-Fi interface; and
   at least one processor in communication with the at least one radio;
   wherein the at least one processor is configured to cause the wireless station to:
      transmit, while operating in a first state, synchronization beacons to a first peer wireless station within one or more discovery windows, wherein the first peer wireless station and the wireless station have an active peer-to-peer data session, and wherein the first peer wireless station and the wireless station are associated with a first cluster of devices;
      notify the first peer wireless station of a merge to a second cluster of devices;
      transition to a second state, wherein transmissions of synchronization beacons to the first peer wireless station are discontinued;
      transmit, while operating in the second state and for at least a first time period, discovery beacons to the first peer wireless station in one or more data cluster management windows; and
      continue, in response to receiving a request for synchronization assistance from the first peer wireless station, transmission of discovery beacons to the first peer wireless station after the first time period.

2. The wireless station of claim 1,
   wherein the at least one processor is further configured to cause the wireless station to:
      discontinue, in response to not receiving a request for synchronization assistance from the first peer wireless station, transmission of discovery beacons to the first peer wireless station after the first time period.

3. The wireless station of claim 1,
   wherein the request for synchronization assistance is received during a data cluster management window.

4. The wireless station of claim 1,
   wherein the request for synchronization assistance is received via one of a broadcast message or a unicast message from the first peer wireless station.

5. The wireless station of claim 4,
   wherein the broadcast message comprises one of a beacon frame or a schedule update notification frame.

6. The wireless station of claim 4,
   wherein a synchronization assistance flag included in one of the broadcast message or unicast message indicates the request for synchronization assistance.

7. The wireless station of claim 4,
   wherein the unicast message comprises one of a schedule update message notification or a schedule request message.

8. The wireless station of claim 1,
   wherein the at least one processor is further configured to cause the wireless station to:
      discontinue, in response to termination of the peer-to-peer data session, transmission of discovery beacons in data cluster management windows.

9. An apparatus, comprising:
   a memory; and
   at least one processor in communication with the memory, wherein the at least one processor is configured to:
      receive synchronization beacons from a first peer wireless station within one or more discovery windows, wherein the first peer wireless station is operating in a first state, wherein the first peer wireless station has an active peer-to-peer data session with the apparatus, and wherein the first peer wireless station and the apparatus are associated with a first cluster of devices;
      receive a notification from the first peer wireless station of a merge to a second cluster of devices, wherein, in response to the merge, the first peer wireless station is configured to transition from the first state to a second state, wherein, in response to the transition to the second state, the first peer wireless station is configured to discontinue transmissions of synchronization beacons;
      generate instructions to transmit a request for synchronization assistance; and
      receive, in response to the request, discovery beacons from the first peer wireless station in one or more data cluster management windows.

10. The apparatus of claim 9,
    wherein the request for synchronization assistance is transmitted during a data cluster management window.

11. The apparatus of claim 9,
    wherein the request for synchronization assistance is transmitted via one of:
    a unicast message comprising one of a schedule update message notification or a schedule request message; or
    a broadcast message comprising one of a beacon frame or a schedule update notification frame.

12. The apparatus of claim 11,
    wherein a synchronization assistance flag included in one of the broadcast message or unicast message indicates the request for synchronization assistance.

13. The apparatus of claim 9,
    wherein the at least one processor is further configured to generate instructions to transmit, in response to receiving a synchronization beacon in a discovery window, a request to cancel synchronization assistance to the first peer wireless station.

14. The apparatus of claim 13,
    wherein the request to cancel synchronization assistance is comprised in a schedule update notification message.

15. The apparatus of claim 13,
wherein the request to cancel synchronization assistance comprises a synchronization assistance cancellation flag indicating the request to cancel.

16. A non-transitory computer readable memory medium storing program instructions executable by processing circuitry to cause a wireless station to:
generate instructions to transmit synchronization beacons to a peer wireless station within one or more discovery windows, wherein the peer wireless station and the wireless station have an active peer-to-peer data session and are associated with a first cluster of devices;
generate instructions to notify the peer wireless station of a merge to a second cluster of devices based, at least in part, on the second cluster of devices having a higher master rank than the first cluster of devices;
generate instructions to discontinue, in response to merging to the second cluster of devices, transmission of synchronization beacons to the peer wireless station;
generate instructions to transmit, for at least a first time period, discovery beacons to the peer wireless station in one or more data cluster management windows;
receive, during one of the one or more data cluster management windows occurring during the first time period, a request for synchronization assistance from the peer wireless station; and
generate instructions to transmit discovery beacons to the peer wireless station after the first time period.

17. The non-transitory computer readable memory medium of claim 16,
wherein the request for synchronization assistance is received via one of a broadcast message or a unicast message from the peer wireless station.

18. The non-transitory computer readable memory medium of claim 16,
wherein a synchronization assistance flag included in one of a broadcast message or a unicast message indicates the request for synchronization assistance.

19. The non-transitory computer readable memory medium of claim 16,
wherein the program instructions are further executable to cause the wireless station to:
detect termination of the peer-to-peer data session; and
generate instructions to discontinue, in response to the termination of the peer-to-peer data session, transmission of discovery beacons in the one or more data cluster management windows.

20. The non-transitory computer readable memory medium of claim 17,
wherein the broadcast message comprises one of a beacon frame or a schedule update notification frame.

* * * * *